US012793172B2

(12) United States Patent
Gnanasambandam et al.

(10) Patent No.: US 12,793,172 B2
(45) Date of Patent: Nov. 10, 2026

(54) LEARNED DICTIONARY BASED WARP BLEND

(71) Applicant: Samsung Electronics Co., Ltd., Suwon-si (KR)

(72) Inventors: Abhiram Gnanasambandam, Frisco, TX (US); John W. Glotzbach, Allen, TX (US); John Seokjun Lee, Allen, TX (US); Hamid Rahim Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 18/917,701

(22) Filed: Oct. 16, 2024

(65) Prior Publication Data

US 2026/0105565 A1 Apr. 16, 2026

(51) Int. Cl.
*G06T 3/4015* (2024.01)
*G06T 7/33* (2017.01)
(Continued)

(52) U.S. Cl.
CPC .............. *G06T 3/4015* (2013.01); *G06T 7/33* (2017.01); *G06T 7/90* (2017.01); *G06T 11/10* (2026.01);
(Continued)

(58) Field of Classification Search
CPC ........... G06T 3/4015; G06T 7/33; G06T 7/90; G06T 11/10; G06T 2207/10024;
(Continued)

(56) References Cited

U.S. PATENT DOCUMENTS 9,530,052 B1 * 12/2016 Pillai .................... G06V 40/197
10,181,188 B2 * 1/2019 Abedini ............... G06V 10/267
(Continued)

FOREIGN PATENT DOCUMENTS

CN 120047784 A * 5/2025 ........... G06V 10/772
JP 2023523047 A 6/2023

OTHER PUBLICATIONS

Wronski, B., et al., "Handheld Multi-Frame Super-Resolution", ACM Transactions on Graphics, vol. 38, No. 4, Jul. 2019, 18 pages.
(Continued)

*Primary Examiner* — Mia M Thomas

(57) ABSTRACT

A method of constructing a dictionary of kernels for blending in multi-frame processing (MFP) includes generating, for each ground truth (GT) image in a set of GT images represented in a full color space, a corresponding feature matrix by generating a set of synthetic raw images represented in a color filter mosaic space, performing demosaicing and registration operations on each of the synthetic raw images to generate a corresponding registered image, choosing a set of patches in each registered image, the location of each patch in one registered image coinciding with the location of a corresponding patch in each other registered image, generating, for each patch, a corresponding pixel value matrix containing pixel values of each color channel of each pixel included in the corresponding patch, and extracting features from the pixel value matrices and generating the feature matrix corresponding to the GT image based on the extracted features.

20 Claims, 10 Drawing Sheets

(51) Int. Cl.

| | |
|---|---|
| ***G06T 7/90*** | (2017.01) |
| ***G06T 11/10*** | (2026.01) |
| ***G06V 10/77*** | (2022.01) |
| ***G06V 10/772*** | (2022.01) |

(52) U.S. Cl.
CPC ........ *G06V 10/7715* (2022.01); *G06V 10/772* (2022.01); *G06T 2207/10024* (2013.01); *G06T 2207/20221* (2013.01)

(58) Field of Classification Search
CPC ........... G06T 2207/20221; G06T 2207/20072; G06V 10/7715; G06V 10/772
See application file for complete search history.

(56) References Cited

U.S. PATENT DOCUMENTS

| | | | | |
|---|---|---|---|---|
| 10,296,605 | B2 | 5/2019 | Barel et al. | |
| 10,395,098 | B2 | 8/2019 | Hwang et al. | |
| 10,685,428 | B2 | 6/2020 | Wang et al. | |
| 11,948,313 | B2 | 4/2024 | Fisher | |
| 2014/0093142 | A1 | 4/2014 | Hayasaka et al. | |
| 2014/0232862 | A1* | 8/2014 | Bala | G06V 10/7715 348/143 |
| 2016/0187199 | A1* | 6/2016 | Brunk | G01J 3/0208 348/89 |
| 2016/0196637 | A1 | 7/2016 | Nguyen et al. | |
| 2021/0027204 | A1* | 1/2021 | Zhang | G06F 17/14 |
| 2022/0044023 | A1* | 2/2022 | Xue | G06V 10/143 |
| 2022/0076062 | A1 | 3/2022 | Lee et al. | |
| 2022/0138568 | A1* | 5/2022 | Smolyanskiy | G06N 3/0442 706/21 |
| 2022/0156588 | A1 | 5/2022 | Perazzi et al. | |
| 2022/0172412 | A1 | 6/2022 | Yan et al. | |
| 2022/0358627 | A1* | 11/2022 | Deng | G06N 3/0464 |
| 2023/0047764 | A1 | 2/2023 | Le et al. | |
| 2023/0065837 | A1* | 3/2023 | Venkatesan | G06T 3/4015 |
| 2023/0099494 | A1* | 3/2023 | Kocamaz | G06V 20/58 382/103 |
| 2023/0206603 | A1* | 6/2023 | Zhang | G06V 10/7715 382/100 |
| 2024/0013315 | A1* | 1/2024 | Xiang | G06F 16/3347 |
| 2024/0073219 | A1* | 2/2024 | Maizels | G06F 21/32 |
| 2024/0185431 | A1 | 6/2024 | Sun et al. | |
| 2025/0285467 | A1* | 9/2025 | Tripathi | G06T 3/18 |

OTHER PUBLICATIONS

Timofte, R., et al., "Anchored Neighborhood Regression for Fast Example-Based Super-Resolution", Proceedings of the IEEE international conference on computer vision, 2013, 8 pages.
Wold, S., et al., "Principal Component Analysis", Chemometrics and Intelligent Laboratory Systems, 1987, 16 pages.
Yang, J., et al., "Image Super-Resolution via Sparse Representation", IEEE transactions on Image Processing, vol. 19, Issue 11, Nov. 2010, 13 pages.
Wikipedia, "k-means clustering," Sep. 29, 2024, 19 pages.
International Search Report and Written Opinion of the International Searching Authority dated Sep. 30, 2025, in connection with International Application No. PCT/KR2025/009134, 8 pages.

* cited by examiner

LEARNED DICTIONARY BASED WARP BLEND

TECHNICAL FIELD

This disclosure relates generally to image processing systems. More specifically, this disclosure relates to systems and methods for generating a learned dictionary of kernels for multi-frame blending in a multi-frame processing procedure.

BACKGROUND

Multi-frame processing (MFP) has become an integral part of smartphone cameras, whereby multiple image frames are captured by the camera and blended together to generate a final sharp image. In an MFP pipeline, blending is an important step in which multiple frames are merged together to produce a single image. In a typical blending operation, kernels are used to filter each frame intelligently so that the blended image retains as much resolution as possible.

SUMMARY

This disclosure relates to systems and methods for generating a learned dictionary of kernels for multi-frame blending in a multi-frame processing (MFP) procedure.

In a first embodiment, a method of constructing a dictionary of kernels for blending in MFP includes the steps of generating, for each ground truth (GT) image in a set of GT images represented in a full color space, a corresponding feature matrix by generating, from the GT image, a set of synthetic raw images represented in a color filter mosaic space, performing demosaicing and registration operations on each of the synthetic raw images to generate a corresponding registered image represented in the full color space, choosing a set of patches in each registered image—each patch including a group of pixels at a location in each registered image, and the location of each patch in one registered image coinciding with the location of a corresponding patch in each other registered image-generating, for each patch, a corresponding pixel value matrix containing pixel values of each color channel of each pixel included in the corresponding patch in each registered image, and extracting features from the pixel value matrices and generating the feature matrix corresponding to the GT image based on the extracted features. The method further comprises generating the dictionary of kernels based on the feature matrices.

In a second embodiment, a device comprises a processor. For each GT image in a set of GT images represented in a full color space, the processor is configured to generate, from the GT image, a set of synthetic raw images represented in a color filter mosaic space, perform demosaicing and registration operations on each of the synthetic raw images to generate a corresponding registered image represented in the full color space, choose a set of patches in each registered image, wherein each patch includes a group of pixels at a location in each registered image, and the location of each patch in one registered image coincides with the location of a corresponding patch in each other registered image, generate, for each patch, a corresponding pixel value matrix containing pixel values of each color channel of each pixel included in the corresponding patch in each registered image, extract features from the pixel value matrices, and generate a feature matrix corresponding to the GT image based on the extracted features. The processor is further configured to generate a dictionary of kernels for blending in MFP based on the feature matrices.

In a third embodiment, a non-transitory computer readable medium contains instructions that when executed cause at least one processor of an electronic device to, for each GT image in a set of GT images represented in a full color space: generate, from the GT image, a set of synthetic raw images represented in a color filter mosaic space, perform demosaicing and registration operations on each of the synthetic raw images to generate a corresponding registered image represented in the full color space, choose a set of patches in each registered image, wherein each patch includes a group of pixels at a location in each registered image, and the location of each patch in one registered image coincides with the location of a corresponding patch in each other registered image, generate, for each patch, a corresponding pixel value matrix containing pixel values of each color channel of each pixel included in the corresponding patch in each registered image, extract features from the pixel value matrices, and generate a feature matrix corresponding to the GT image based on the extracted features. The instructions further cause the processor to generate a dictionary of kernels for blending in MFP based on the feature matrices.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

The present disclosure recognizes that currently existing techniques for performing blending during MFP can produce low quality results. In particular, the use of handcrafted kernels for blending results in poor performance around high texture areas of input images. To address the issues with handcrafted kernels the present disclosure provides methods for generating learned dictionaries of kernels. The learned dictionary of kernels is free from human bias in the generation process, and provides better image quality (particularly in high texture regions of the image).

The present disclosure further recognizes that current procedures for selecting an appropriate kernel for blending from a dictionary of kernels are computationally complex. The present disclosure provides improved procedures for selecting kernels for the blending procedure at runtime by reducing the computational complexity of searching the dictionary for the appropriate kernel for any given pixel. In particular, the present disclosure provides procedures for creating a binary search tree for searching the learned kernel dictionary. This reduces the search computation complexity from $O(n)$ to $O(\log n)$, which improves the capability of low powered devices (e.g., some mobile devices) to utilize the learned kernel dictionary for blending.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. In general, this disclosure is not limited to use with any specific type(s) of device(s).

Figure 1:
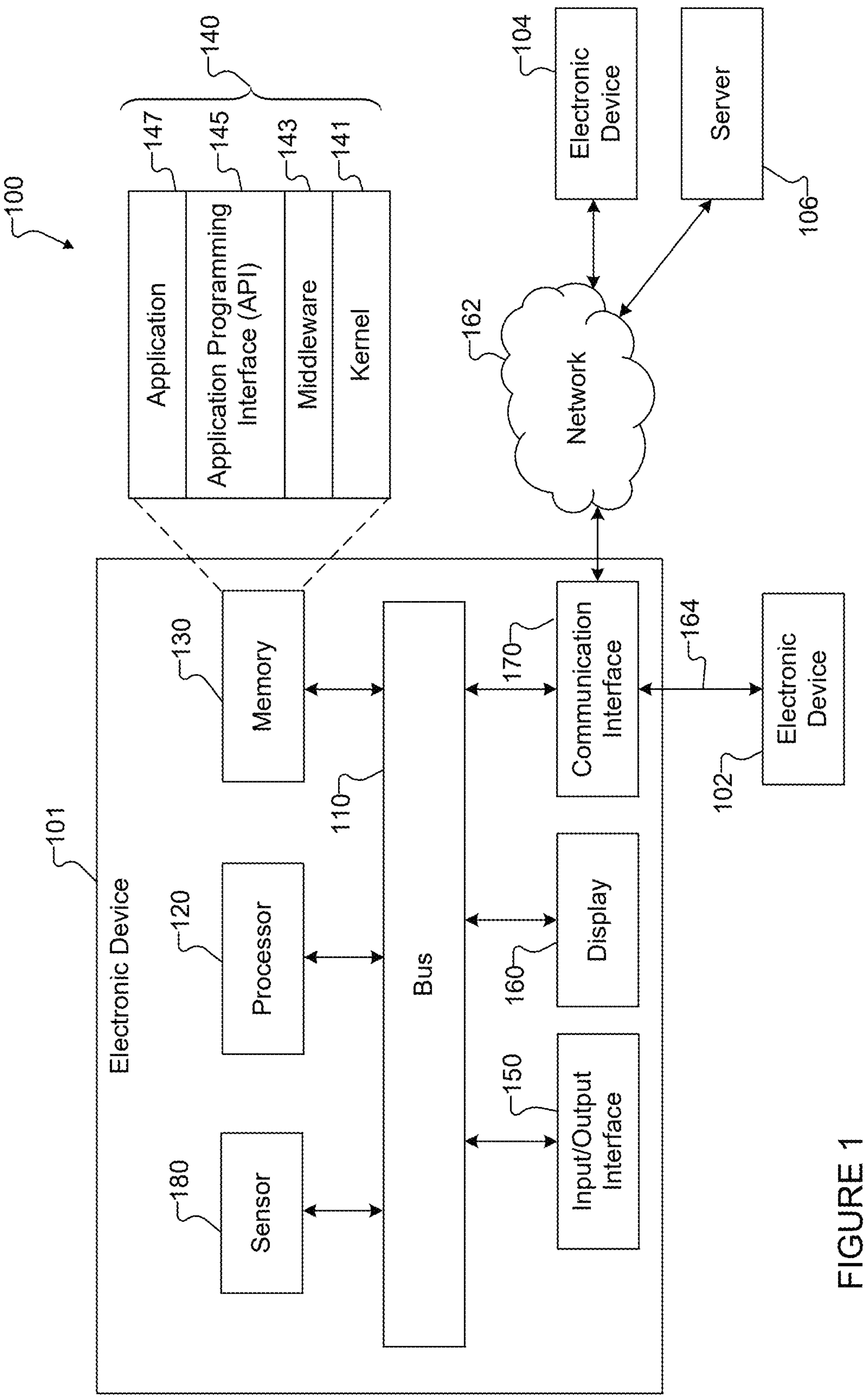
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to generating a learned dictionary of kernels for multi-frame blending in an MFP procedure, and/or performing multi-frame blending in an MFP procedure using a learned dictionary of kernels.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to generating a learned dictionary of kernels for multi-frame blending in an MFP procedure, and/or performing multi-frame blending in an MFP procedure using a learned dictionary of kernels. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 may perform various operations related to generating a learned dictionary of kernels for multi-frame blending in an MFP procedure, and/or performing multi-frame blending in an MFP procedure using a learned dictionary of kernels. The server 106 may also instruct other devices to perform certain operations or display content on one or more displays 160. The server 106 may further receive inputs (such as data samples to be used in training machine learning models) and manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

For simplicity, embodiments of the present disclosure are described as being performed by an electronic device that is a server 106. However, the embodiments of the present disclosure could be implemented on any other suitable device, such as an electronic device 101 which is a smartphone. Additionally, portions of the embodiments may be performed on different devices—for example, training of a dictionary of kernels for MFP blending may be performed on a server 106, while inference during blending may be performed on a smartphone. It is understood that references to an electronic device or a smartphone herein below are not intended to limit the present disclosure to any particular implementation of an electronic device.

Figure 2:
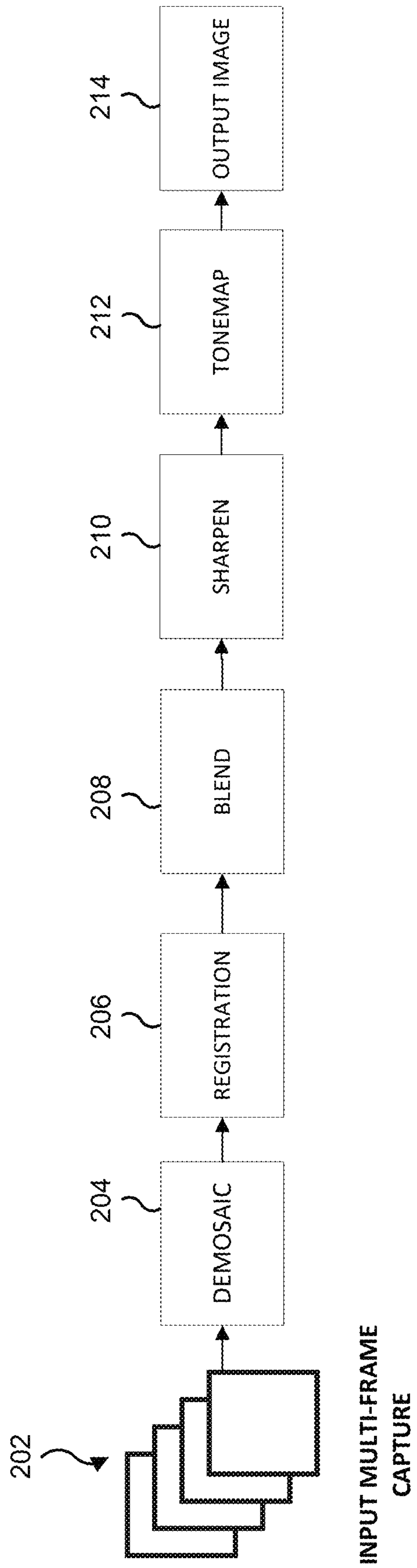
FIG. 2 illustrates an example MFP pipeline in accordance with this disclosure.

FIG. 2 illustrates an example MFP pipeline 200 in accordance with this disclosure. In the example 200 of FIG. 2, multiple raw image frames 202 are captured by a camera of an electronic device. The raw image frames 202 are represented in a color filter mosaic (or color filter array) space. For example, the camera may use a Bayer color filter mosaic (or array), and the raw image frames 202 are represented in the Bayer color filter mosaic space. Demosaicing 204 is then performed on the raw image frames 202 to convert them to a full color space (e.g., RGB, YUV or the like). Registration 206 is performed on the demosaiced image frames to align them with each other. Blending 208 is performed on the aligned and demosaiced images, then sharpening 210 and tonemapping 212 are performed to generate a final output image 214.

In the example of FIG. 2, blending 208 may be performed using kernels to filter each of the aligned and demosaiced images intelligently so that the blended image retains as much resolution as possible. In current blending operations, one method of ensuring that the MFP pipeline retains as much resolution as possible while reducing the amount of noise is to use hand-crafted kernels which are chosen based on local statistics. To do this, a dictionary of kernels that can be used in the blending is generated ahead of runtime.

For example, a number of different kernels may be generated with different orientations and spreads, which are usually anisotropic gaussian kernels. Here, the full range of values of orientations and spreads that need to be considered for the blending operation is decided. Next, the local statistics that are to be used when choosing a kernel are determined. For example, orientation, strength, and coherence of a neighborhood around each pixel may be used as the local statistics. At this point, the full range of values to be considered for the local statistics is determined—e.g., the full range of values for orientation, the full range of values for strength, and the full range of values for coherence. The dictionary of kernels may then be formed by associating one of the kernels generated above with a combination of values for the local statistics (e.g., one of the kernels is associated with each combination of possible values for orientation, strength, and coherence).

At runtime, this dictionary may be used for blending by choosing kernels from the dictionary pixel-wise for each frame. For example, the local statistics for each pixel of each frame may be determined, and a kernel may then be selected from the dictionary based on the determined local statistics. The selected kernel is applied to that pixel for each frame (e.g., the corresponding pixel at the same location in each frame), and the resulting images may then be summed together to get the final image.

Figure 8:
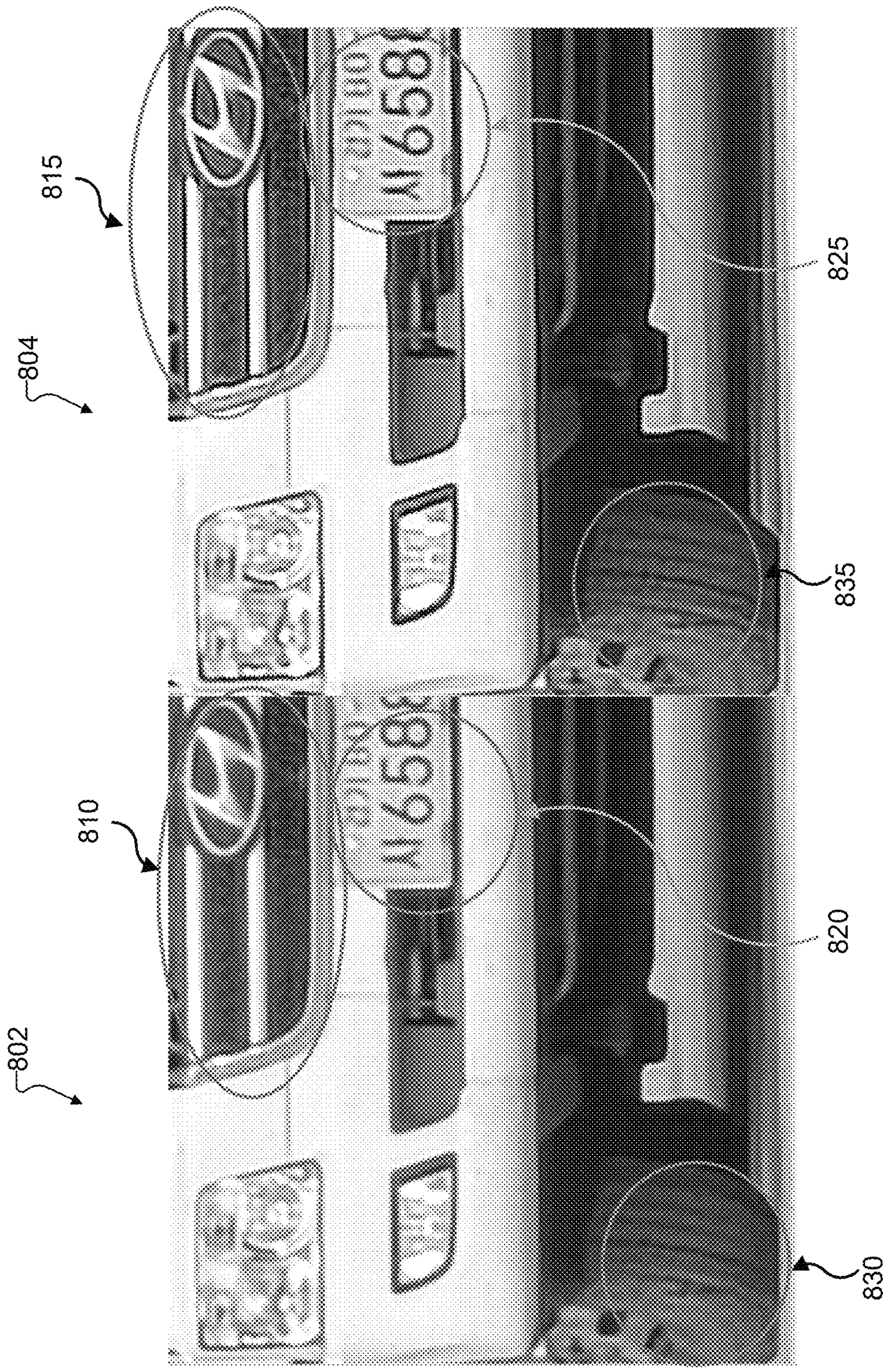
FIG. 8 illustrates example blended images output from MFP pipelines in accordance with this disclosure.

Handcrafted kernels as described above have certain issues, especially in high texture regions (e.g., around text, foliage, or the like). In high texture regions coherence decreases, resulting in a small circular kernel being chosen from the dictionary. Blending with such a kernel usually leads to a blurred image, and may sometimes create artificial patterns that did not exist in the original image frames. This is illustrated in the example of FIG. 8, which is discussed in further detail below. Furthermore, the kernels suffer from human bias during their creation (e.g., in the choice of the full range of values of orientation and spread of the kernels, the local statistics to be used, and the full range of values for the local statistics).

To address the issues with handcrafted kernels described above, the present disclosure provides methods for generating learned dictionaries of kernels—that is, dictionaries of kernels in which the kernels themselves are learned and the classification of the kernels based on local statistics is learned. The learned dictionary of kernels is free from human bias in the generation process, and provides better image quality (particularly in high texture regions of the image).

Embodiments of the present disclosure include generation of multi-frame data and corresponding ground truth (GT) data needed for training the dictionary, and breaking down this data into smaller patches for training. This includes leveraging techniques such as described in "Timofte, Radu, Vincent De Smet, and Luc Van Gool. 'Anchored neighborhood regression for fast example-based super-resolution.' *Proceedings of the IEEE international conference on computer vision,* 2013," which is incorporated by reference herein. to learn a dictionary of input patches and corresponding ground truth patches. Embodiments of the present disclosure additionally learn the local statistics to be used for the learned dictionary.

Figure 3A:
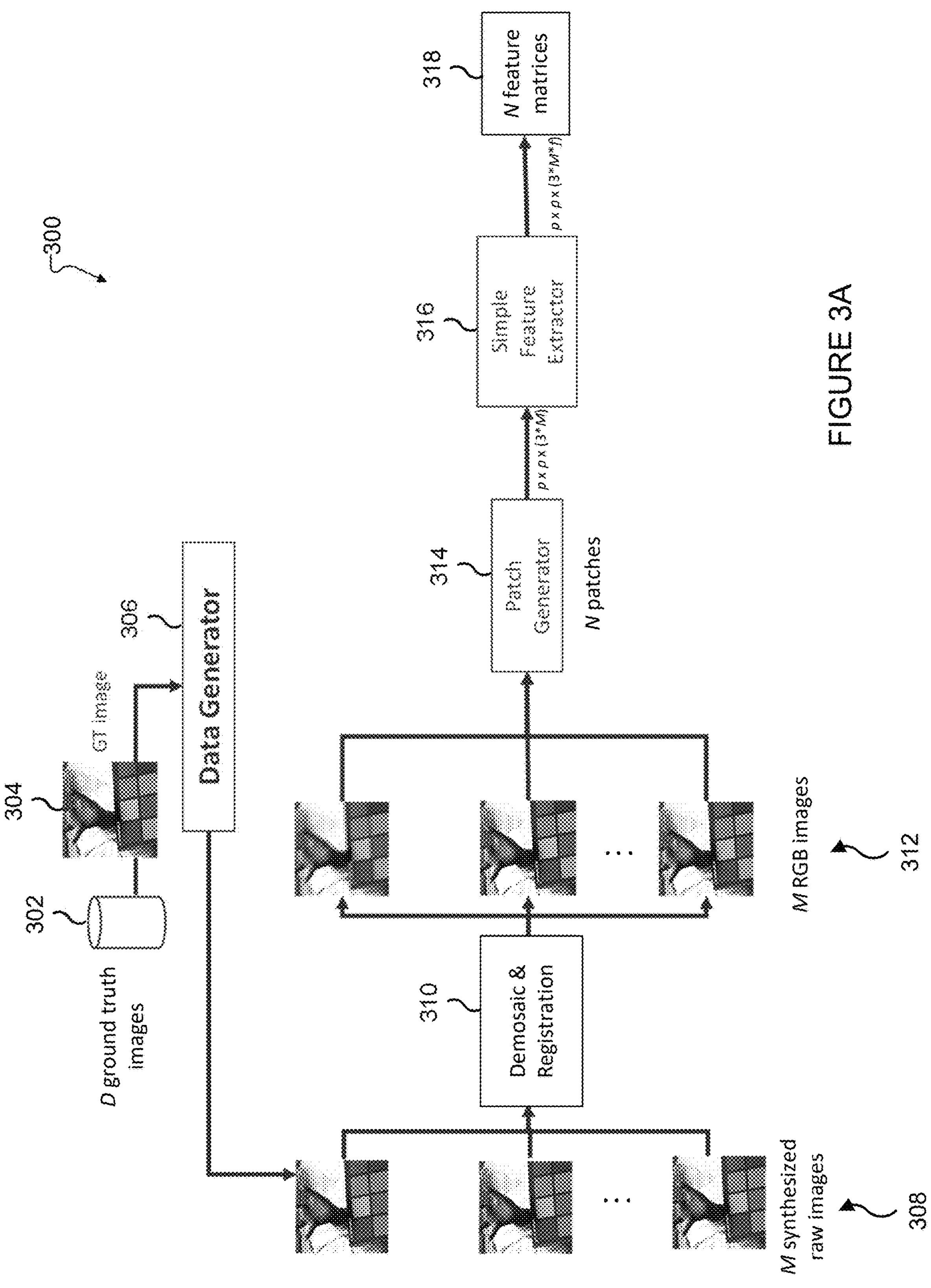
FIGS. 3A and 3B illustrate an example procedure for training a learned dictionary of kernels in accordance with this disclosure.
Figure 3B:
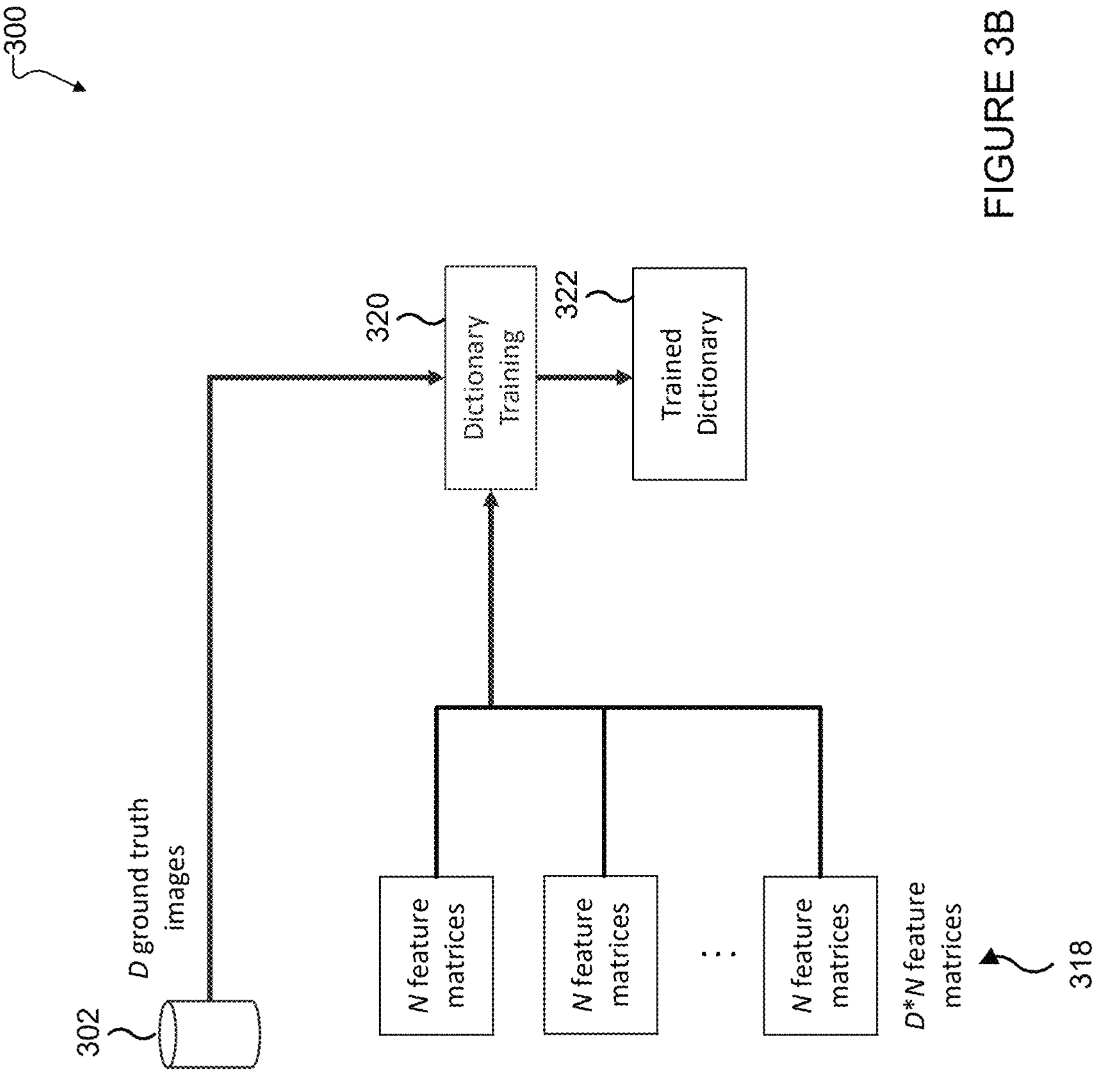

FIGS. 3A and 3B illustrate an example procedure 300 for training a learned dictionary of kernels in accordance with this disclosure. The example procedure 300 of FIGS. 3A and 3B may be performed by a device such as the electronic device 101, the server 106 of FIG. 1, or any other suitable device. In some embodiments, the example procedure 300 may be performed by a combination of multiple electronic devices.

In the example procedure 300 of FIGS. 3A and 3B, a database 302 of ground truth (GT) images is configured to include a set of GT images 304 that are known to be good candidates for training a dictionary for MFP blending. For example, the GT images 304 may include high texture areas and text to train the dictionary on such features. The GT images 304 are full color images that are represented in a color space (e.g., RGB, YUV, or any other appropriate color space). For simplicity, the examples provided below use the RGB color space.

FIG. 3A illustrates a portion of the procedure that generates a simple feature matrix for one GT image 304 from the database 302. The system uses a data generator 306 on the GT image 304 to generate a set of M synthetic raw images 308 based on the GT image 304. The synthetic raw images 308 are represented in a color filter mosaic space (e.g., as if they were raw image frames captured by a camera using a Bayer filter or any other appropriate color filter mosaic or color filter array). In some embodiments, the data generator 306 may be implemented using the techniques described in U.S. patent application Ser. No. 18/363,596, which is incorporated by reference herein.

The system then performs demosaicing and registration procedures 310 on each of the M synthetic raw images 308 to generate a set of M demosaiced and registered images 312—i.e., images that are represented in the same color space as the original GT image 304 (e.g., RGB) and that are registered (or aligned) with each other. The demosaicing and registration procedures 310 may include super resolution as well.

The system then uses the patch generator procedure 314 to choose a predetermined number N of patches for each registered image 312. Each patch may be a square of size p×p pixels. In generating the patches, the N patches in one registered image may be randomly selected.

Figure 4:
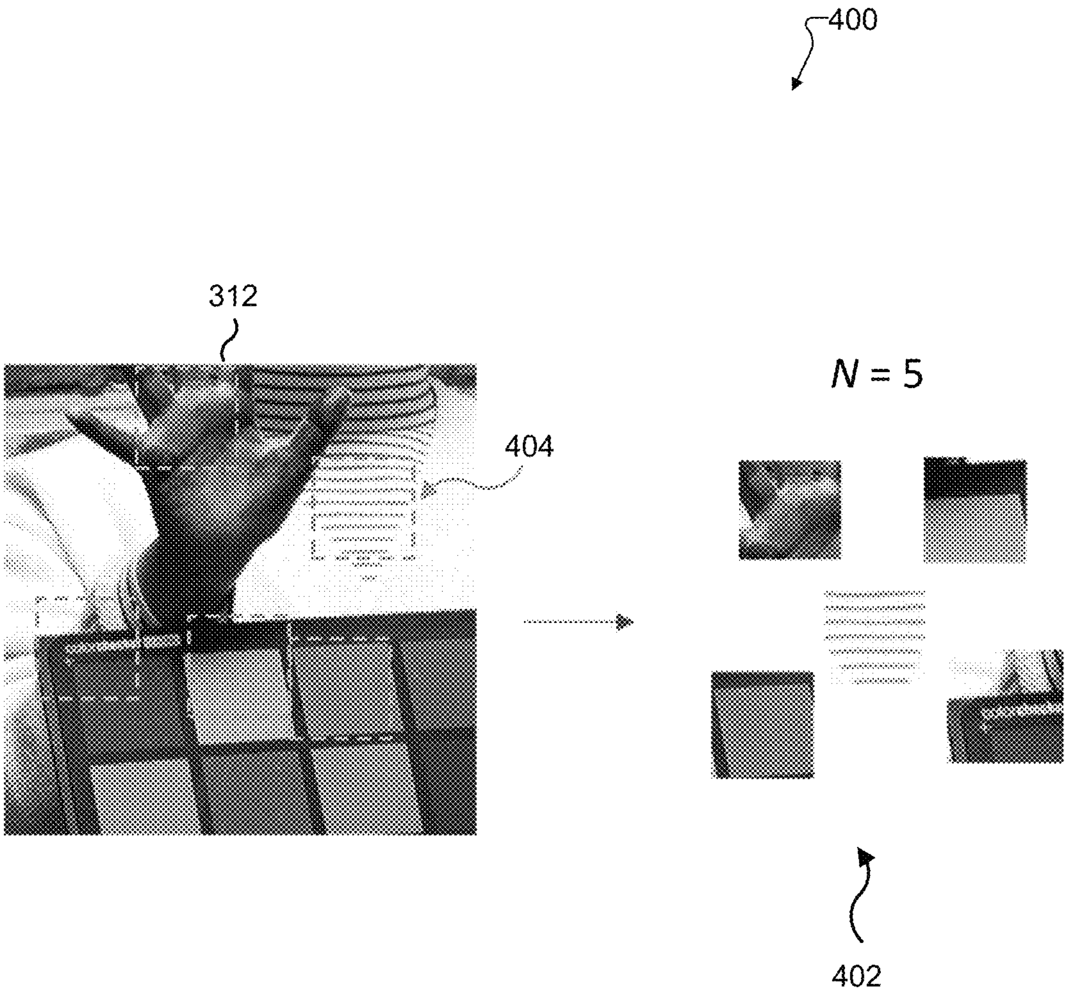
FIG. 4 illustrates an example of selection of patches from a registered image in accordance with this disclosure.

FIG. 4 illustrates an example 400 of selection of patches from a registered image 312. In the example 400 of FIG. 4, N patches 402 are selected from the registered image 312, and N=5. The N patches 402 each has a corresponding location 404 in the registered image 312, indicated by dotted lines in FIG. 4.

Referring again to FIG. 3A, each of the patches in one registered image 312 coincides in location with a corresponding one of the patches in each other registered image 312. For each patch location, the patch generator procedure 314 notes the pixel values for each color channel (e.g., the red, green, and blue color channels in the RGB color space) in each of the M registered images 312, and generates a corresponding matrix of size p×p×(3*M), where 3 is the number of color channels in the color space. For simplicity, this may be referred to as a pixel value matrix. The number of color channels may be adjusted depending on the color space used by the GT image 304 (e.g., 4 channels for the CMYK color space).

Using the RGB color space as an example, the first 3 p×p entries of the pixel value matrix for one patch location correspond to the R, G, and B pixel values for the first registered image 312, the next 3 p×p entries correspond to the R, G, and B pixel values for the second registered image 312, and so on until the last 3 p×p entries that correspond to the R, G, and B pixel values for the $M^{th}$ registered image 312. Given N patches, the patch generator procedure 314 generates a set of N such pixel value matrices.

For each of the N patches, some initial simple features may be extracted from its corresponding p×p×(3*M) pixel value matrix. In general, f simple features can be chosen for each patch. Standard features may include 2D gradients and 2D Laplacians. Any appropriate methods may be used to extract 2D gradients and 2D Laplacians. In the example 300, for each of the N pixel value matrices produced by the patch generator procedure 314, the system uses a simple feature extractor procedure 316 that extracts f features, resulting in a feature matrix 318 of size p×p×(3*M*f).

For each feature matrix 318 of size p×p×(3*M*f), the first 3*f p×p entries correspond to features of the R, G, and B channels for the first registered image 312, the next 3*f p×p entries correspond to features of the R, G, and B channels for the second registered image 312, and so on until the last 3*f p×p entries correspond to features of the R, G, and B channels for the $M^{th}$ registered image 312. Given N patches, the simple feature extractor procedure 316 generates a set of N such feature matrices 318.

Referring now to FIG. 3B, the procedure of FIG. 3A is iterated for each of the D GT images 302, resulting in D*N feature matrices 318. Each GT image 302 is associated with the set of N feature matrices 318 that was generated in the procedure of FIG. 3A using the GT image 302 as input. The feature matrices 318 and the GT images 302 are input to a machine learning (ML)-based—or artificial intelligence (AI)-based—dictionary training model 320 to produce a trained dictionary 322 of kernels for MFP blending. In some examples, the dictionary training model 320 leverages techniques such as those disclosed in "Timofte, Radu, Vincent De Smet, and Luc Van Gool. 'Anchored neighborhood regression for fast example-based super-resolution.' *Proceedings of the IEEE international conference on computer vision,* 2013". During the training stage, data from all color channels is used concurrently for training the dictionary 322. In some embodiments, however, the same trained dictionary 322 is used separately for each of the color channels during inference.

In some embodiments, the dictionary training model 320 generates a principal component analysis (PCA) matrix, dictionary entries, and projection matrices which, combined, comprise the trained dictionary 322. These are described further below.

The dictionary training model 320 obtains the PCA matrix by performing principal component analysis on the simple features obtained from all patches over the entire set of GT images 302. In general, PCA is a dimensionality reduction method that is often used to reduce the dimensionality of large data sets by transforming a large set of variables into a smaller one that still contains most of the information in the large set. In this procedure, c is the number of principal features (i.e., the reduced set of variables), and is a parameter chosen by the system designer.

The process of performing principal component analysis to obtain the PCA matrix begins with obtaining the D*N features matrices 318, each of size p×p×(3*M*f). Each feature matrix 318 is then flattened into a vector of size 1×(p*p*3*M*f), resulting in D*N such vectors. Any appropriate PCA dimensionality reduction algorithm (such as those found in "Wold, S., Esbensen, K., & Geladi, P. (1987). Principal component analysis. *Chemometrics and intelligent laboratory systems,* 2 (1-3), 37-52," which is incorporated by reference herein) may be used on these D*N vectors to construct a PCA matrix $V_{PCA}$ of size (p*p*3*M*f)×c. This PCA matrix can be used to convert the vector of size 1×(p*p*3*M*f) to size 1×c. For the purposes of dictionary training, the D*N vectors of size 1×(p*p*3*M*f) are converted into D*N vectors $F_{1\times c}$ of size 1×c, as described in the following equation:

$$F_{1\times c} = \text{Input}_{1\times(p*p*3*M*f)} \cdot V_{PCA_{(p*p*3*M*f)\times c}} \quad (1)$$

These D*N vectors $F_{1\times c}$ are stacked together into a matrix $F_{D*N\times c}$ that is used for dictionary learning in the dictionary training model 320, as well as for inference during MFP blending. During inference, the PCA matrix projects the simple features obtained from each input patch to a principal domain (containing principal features represented by $F_{1\times c}$).

A dictionary is, in general, an efficient way of representing a large dataset. To solve the problem of the present disclosure, two dictionaries are generated by the dictionary training model 320—one dictionary corresponding to inputs (e.g., raw image frames), and one dictionary corresponding to outputs (e.g., full resolution, full color images). The input dictionary is a low resolution dictionary which corresponds to the features $F_{D*N\times c}$ derived using the PCA matrix, and the output dictionary corresponds to the GT patches available, represented by $G_{D*N\times p*p*3}$, assuming that the GT patches are same resolution RGB images. Any appropriate coupled dictionary learning method may be used to generate these dictionaries. The following equation provides one formulation of this problem:

$$\min_{D_h,D_l,Z} \frac{1}{p*p*3}\|G^T - D_h Z\|^2 + \frac{1}{c}\|F^T - D_l Z\|^2 + \lambda\left(\frac{1}{c} + \frac{1}{p*p*3}\right)\|Z\|_1 \quad (2)$$

Where the matrix $D_h$ is the output dictionary, and the matrix $D_l$ is the input (or low resolution) dictionary. The size of $D_h$ is (p*p*3)×d. The size of $D_l$ is c×d. The size d is chosen by the system designer. Each column of each matrix is a dictionary entry, and both of the dictionaries have d entries. The dictionary that is output from the dictionary training model 320 is the low resolution dictionary $D_l$. The dictionary $D_h$ is used to generate the projection matrix, as described further below.

During inference, the low resolution dictionary $D_l$ is used to locate the most appropriate kernel for an input patch. After calculating the principal features (e.g., $F_{1\times c}$) for the input patch using the PCA matrix, the nearest dictionary entry in the dictionary $D_l$ is found by calculating a distance between the principal features vector and the dictionary entries.

A projection matrix is a mapping from the principal feature space back into the image space. The dictionary training model 320 may use any of a number of appropriate methods to generate the projection matrix. In one example, for each dictionary entry $D_i$ in $D_l$, the method begins with finding the K nearest dictionary entries using correlation as the distance measure. Then, for each dictionary entry $D_i$, using only the dictionary entries in the neighborhood, two matrices are created: $D_{l,i}$ of size (c×K) and $D_{h,i}$ of size (p*p*3)×K. Next, for each dictionary entry D_i a projection matrix $P_i$ is generated, described by:

$$P_i = D_{h,i}\left(D_{l,i}^T D_{l,i} + \lambda I\right)^{-1} D_{l,i}^T,$$

where $P_i$ has size (p*p*3)×c.

During inference, for each patch, once the closest dictionary entry is found, the output is obtained by performing a matrix multiplication between the projection matrix corresponding to that dictionary entry and the principal features vector.

Figure 5:
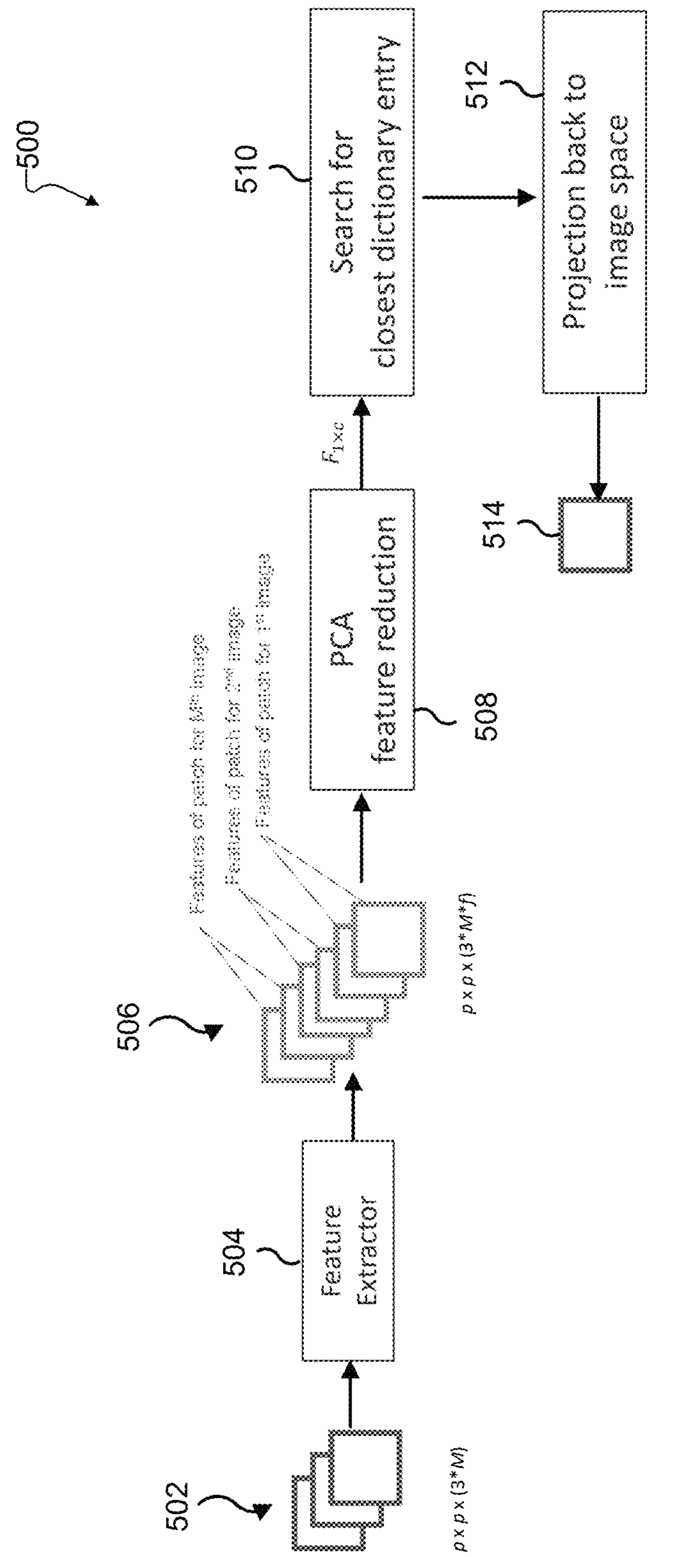
FIG. 5 illustrates an example inference pipeline in an MFP pipeline at runtime in accordance with this disclosure.

FIG. 5 illustrates an example inference pipeline 500 in an MFP pipeline at runtime in accordance with this disclosure. The example inference pipeline 500 of FIG. 5 corresponds to the blending stage of an MFP pipeline at runtime.

Before reaching the inference pipeline 500, M raw image frames are obtained from a camera (e.g., using a Bayer filter) and demosaicing and registration are performed on the raw images to obtain M demosaiced and registered images (e.g., RGB images). Next, N input patches of size p×p are selected from each registered image. The input patch selection may be performed using a procedure similar to the patch generator procedure 314 described above with respect to the example of FIG. 3A. Accordingly, each of the input patches in one registered image coincides in location with a corresponding one of the input patches in each other registered image, and a pixel value matrix of size p×p×(3*M) that includes the pixel values for each color channel (e.g., the R, G, and B color channels) is generated for each of the input patches. This results in a set of N such pixel value matrices, each corresponding to one input patch. These N pixel value matrices are sent to the inference pipeline 500 of FIG. 5 for blending.

The example inference pipeline 500 of FIG. 5 illustrates the inference pipeline with respect to one of the input patches of size p×p having 3 color channels. The corresponding pixel value matrix 502 of size p×p×(3*M) is input to the inference pipeline 500. A feature extractor procedure 504 (which may be similar to the simple feature extractor procedure 316 described above with respect to the example of FIG. 3A) extracts/features from the input pixel value matrix 502 to generate a feature matrix 506 of size p×p×(3*M*f). The first 3*f p×p entries of the feature matrix 506 correspond to features of the R, G, and B channels for the first registered image, the next 3*f p×p entries correspond to features of the R, G, and B channels for the second registered image, and so on until the last 3*f p×p entries correspond to features of the R, G, and B channels for the $M^{th}$ registered image. In the illustrated example, 2 features are extracted (i.e., f=2).

The system continues the pipeline 500 by performing the PCA feature reduction procedure 508 on the feature matrix 506. The PCA feature reduction procedure 508 uses the PCA matrix $V_{PCA}$ to perform feature reduction as discussed above with respect to the dictionary training model 320. During inference, the PCA matrix projects the simple features obtained from each input patch to a principal domain (containing principal features). Equation (1) above may be used to represent this stage of inference, where $\text{Input}_{1\times(p*p*3*M*f)}$ is a flattened vector representing the matrix of simple features of the input patch, and the output $F_{1\times c}$ represents the principal features used as the basis to find the appropriate kernel for the patch.

After calculating the principal features $F_{1\times c}$ for the input patch using the PCA matrix, the next step is to find the nearest dictionary entry (e.g., in the dictionary $D_l$ discussed above) using the dictionary search procedure 510 of the pipeline 500. To do this, a distance is calculated by performing a dot product between the features and the dictionary matrix $D_l$. The nearest dictionary entry (referred to as idx) is commonly found by performing an exhaustive search of all dictionary entries as described by the following equation, which is very resource intensive. Equation (3) describes such an exhaustive search:

$$idx = \max_i F_{1\times c} \cdot D_i \quad (3)$$

where $D_i$ represents one dictionary entry of size 1×c in the dictionary matrix $D_l$, for i∈{1, . . . , d}. The computational complexity of this search is O(d). Embodiments of the present disclosure provide a more efficient dictionary search procedure 510.

In particular, embodiments of the present disclosure include generating a binary search tree for the d dictionary entries $D_i$ in the dictionary matrix $D_l$. This may be done during the training stage (e.g., when the dictionary is trained using the dictionary training model 320). A modified k-means clustering algorithm may be used to generate the binary search tree, wherein the modifications ensure that the number of points in each cluster is always equal. The following is an example of an algorithm that may be used to build such a binary search tree:

```
No_clusters(0) = 1
Cluster(0,0) = {D_i}_{i=1..d}
for j = 1:log(d)
  for k = 0:No_clusters(j−1)−1
    {Cluster(i,2*k), Cluster(1,2*k+1)} = k_means(k=2) *
    Cluster_center(i*2*k) = mean({Cluster(1,2*k)})
    Cluster_center(i*2*k + 1) = mean({Cluster(1,2*k+1)})
  end for
  No_clusters(i) = 2^i
end for
```

Figure 6:
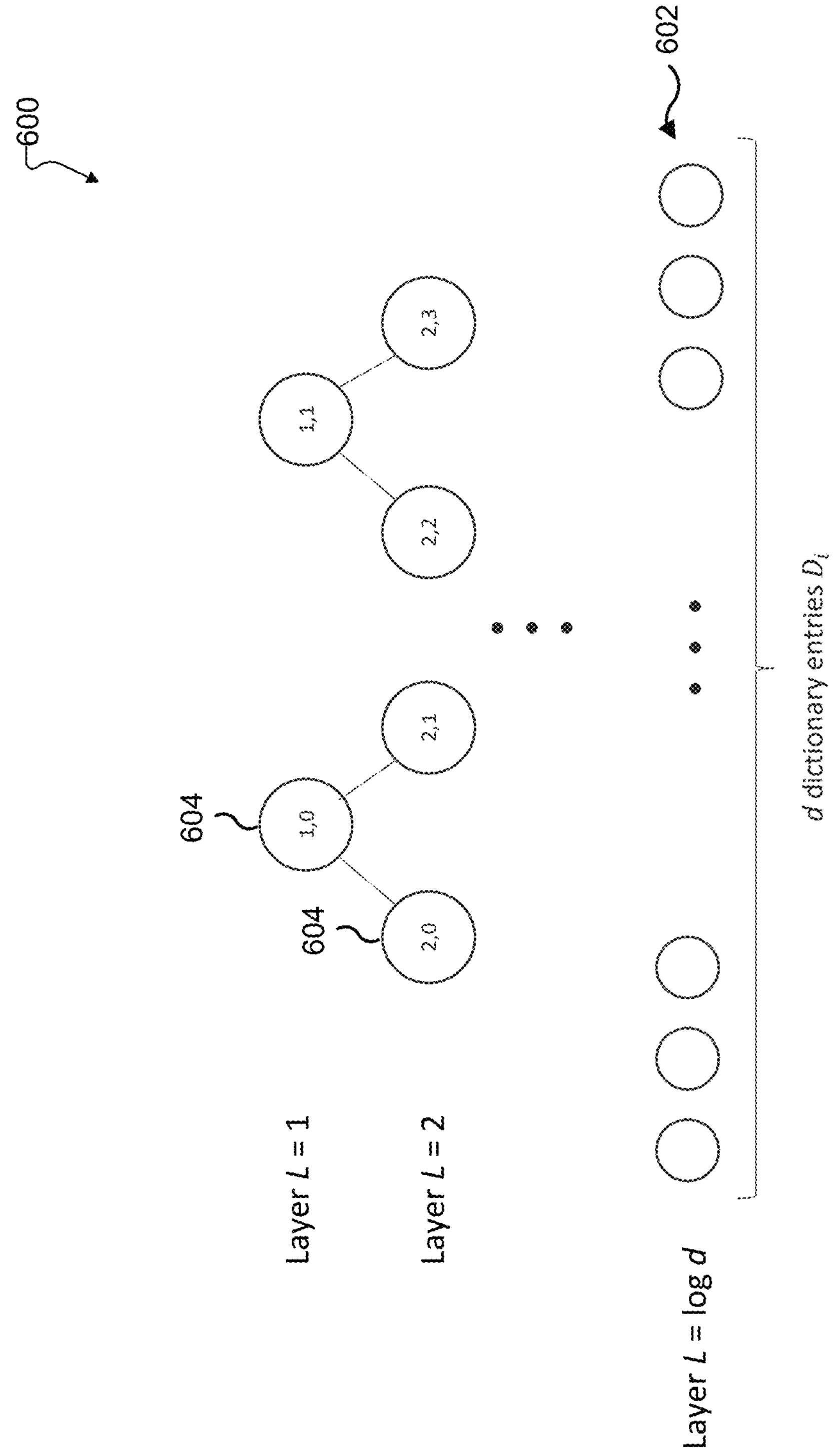
FIG. 6 illustrates an example binary search tree in accordance with this disclosure.

FIG. 6 illustrates an example binary search tree 600 in accordance with this disclosure. In the example of FIG. 6, the binary search tree 600 is built to search the d dictionary entries $D_i$ in the dictionary $D_l$. The binary search tree 600 is constructed from the bottom upwards by clustering pairs of dictionary entries obtained from the algorithm together based on distance. The binary search tree 600 has a number of layers (or levels) L=log d, and the bottom layer includes each of the d dictionary entries as leaf nodes 602 of the binary search tree. To create the next higher layer (e.g., L=log d−1), the nodes are clustered into pairs that become children nodes of a single parent node in the next layer. In the layers above the bottom layer, each node 604—indicated by (L,i), where i is an index within layer L—has a dictionary entry associated with it which is obtained by averaging the dictionary entries associated with its two children nodes in the next lower layer. The binary search tree 600 is generated ahead of runtime, and is saved for use in the inference pipeline 500 at runtime.

Using the binary search tree 600 in the dictionary search procedure 510, the system starts searching from the top of the search tree (i.e., at layer L=1). At each level, the distance of the input patch (in terms of its principal feature vector $F_{1\times c}$) from each of two dictionary entries—e.g., the entries associated with nodes (1,0) and (1,1) for the top layer—is calculated. After the node (L,i) corresponding to the closest dictionary entry to the feature vector is determined, the system descends to the next layer (e.g., layer L+1) and performs the distance comparison with the two dictionary entries corresponding to the children nodes of node (L,i)—e.g., nodes (2,0) and (2,1) if node (1,0) is the closest node in L=1. This continues until the system reaches the bottom layer L=log d and determines the leaf node associated with the dictionary entry idx which is closest to the feature vector $F_{1\times c}$. The system is then able to select the projection matrix $P_{idx}$ that corresponds to dictionary entry idx for use in inference. Compared to the exhaustive search method of Equation (3) which has computational complexity O(d), the computational complexity of the binary tree search is reduced to O(log d).

Referring again to FIG. 5, once the closest dictionary entry (e.g., entry idx) is found using the dictionary search procedure 510, the system uses the projection procedure 512 to project the principal features vector $F_{1\times c}$ from the principal feature space back into the image space using a projection matrix $P_{idx}$ that corresponds to the closest dictionary entry idx. This may be done by performing a matrix multiplication between the projection matrix $P_{idx}$ and the principal features vector, as follows:

$$\text{out}_{1\times(p*p*3)} = F_{1\times c}\cdot P_{idx}^T \tag{4}$$

This output vector is then rearranged into a blended full resolution, full color (e.g., RGB) output patch 514 of size p×p. The procedure of the example pipeline 500 is performed for each of the N input patches to obtain corresponding blended RGB output patches.

According to some embodiments, during the inference stage the N input patches are selected to be overlapping, such that every pixel has an output from multiple patches once all N input patches have gone through the inference pipeline. For each pixel, all outputs that correspond to that pixel from any of the N input patches that include the pixel are averaged to produce the final blended image.

Figure 7:
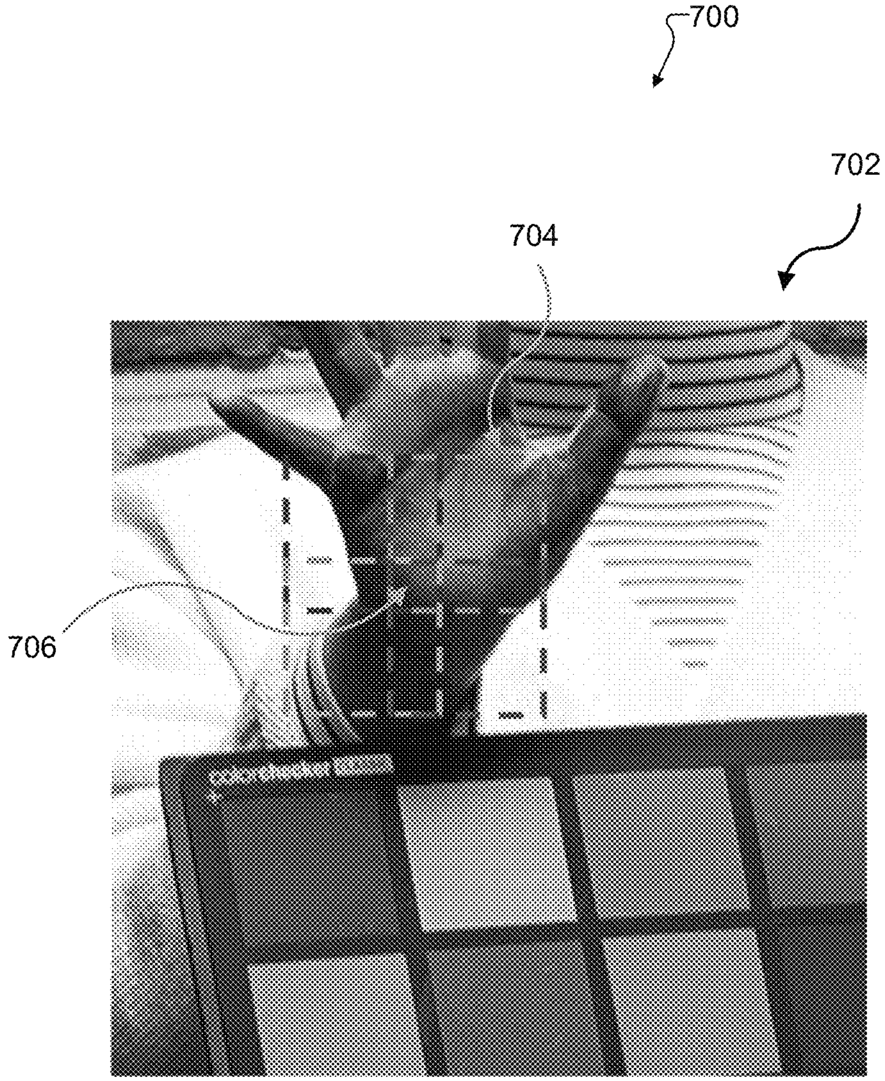
FIG. 7 illustrates an example of overlapping input patch selection in accordance with this disclosure.

FIG. 7 illustrates an example 700 of overlapping input patch selection in accordance with this disclosure. In the example of FIG. 7, one input frame 702 is illustrated with four input patches 704 selected. In this example, the pixels in region 706 are contained within each of the input patches 704. After the input patches 704 have gone through the inference pipeline 500 of FIG. 5, the pixels in region 706 will have inference from each of the four different input patches 704. Accordingly, for each pixel in region 706, all outputs that correspond to that pixel from any of the four input patches 704 are averaged in producing the final blended image.

FIG. 8 illustrates example blended images output from MFP pipelines in accordance with this disclosure. In the example of FIG. 8, the image 802 is a final blended image that is output from previous MFP pipelines using hand-crafted kernels for blending, while the image 804 is an example final blended image output from an MFP pipeline using a learned (or trained) dictionary of kernels for blending as described in this disclosure. Both images are derived from the same set of input frames.

As illustrated in FIG. 8, in regions 810, 820, and 830 of the image 802, which have high texture details, the image is of poor quality. Comparing this with the image 804, the corresponding regions 815, 825, and 835 have improved sharpness and details as a result of performing MFP with the learned dictionary described in this disclosure.

Although embodiments of this disclosure are described using the RGB color space, this is merely one example, and the procedures described herein may be modified to work with other color spaces. For example, the procedures may be used for YUV images. In such cases, the trained dictionary may be used to enhance the Y channel, and thus in the training stage only the Y channel will be used.

Additionally, although embodiments of this disclosure are described for M frames, this is merely one example. Instead of using M frames, the embodiments could be modified to work with a single frame that is an average of M frames. This may be useful when the amount of computation required is a bottleneck on performance. If multi-frame training data is available, the averaged image may be used for training. Otherwise, single frame training data is sufficient.

The embodiments of this disclosure may also be extended for higher resolutions. For example, if 2× super resolution is desired, then the GT images used will have double the resolution along both height and width. In both the training and inference phases, if the input patch size is pxp pixels, the GT will be 2*p×2*p.

Figure 9:
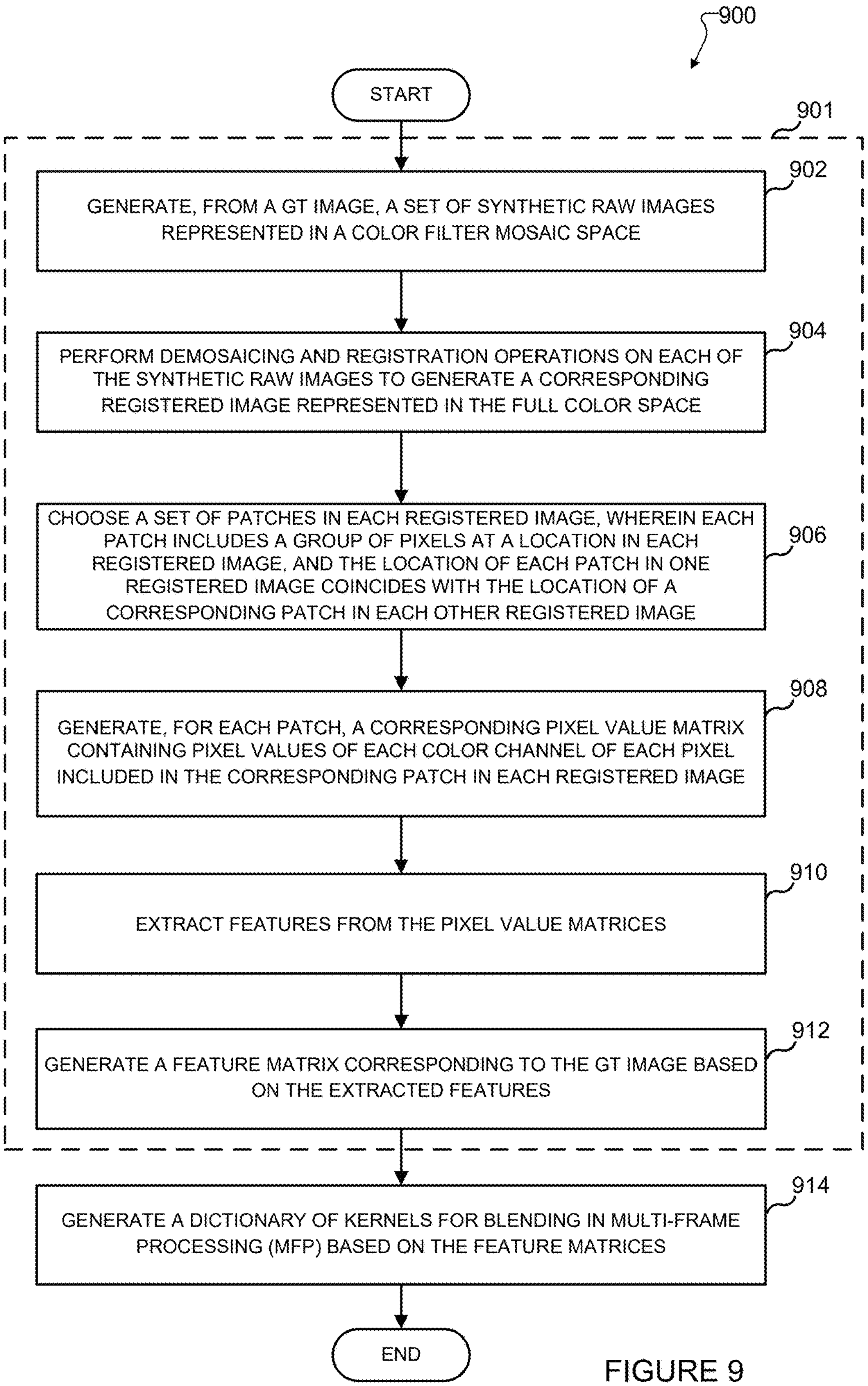
FIG. 9 illustrates an example method for generating a learned dictionary of kernels for multi-frame blending in an MFP procedure in accordance with this disclosure.

FIG. 9 illustrates an example method 900 for generating a learned dictionary of kernels for multi-frame blending in an MFP procedure in accordance with this disclosure. For case of explanation, the method 900 shown in FIG. 9 is described as being performed by a processor of an electronic device, which may be the server 106 in the network configuration 100 of FIG. 1. However, the method 900 could be performed using any other suitable device(s), such as the electronic device 101, and in any other suitable system(s). As a particular example, portions of the method 900 can be executed on the server 106 in the network configuration 100 of FIG. 1, and a trained dictionary of kernels can be provided to a client electronic device 101 (e.g., a smartphone) for use during inference in an MFP pipeline.

In the method 900, the set of steps 902-912 included in subprocess 901 is performed for each GT image in a set of GT images to generate a feature matrix corresponding to each GT image. The GT images are represented in a full color space such as, for example, the RGB color space. The set of GT images may be contained in a database of the electronic device, or may be obtained from an external database.

At block 902, for one of the GT images, the electronic device generates, from the GT image, a set of synthetic raw images represented in a color filter mosaic space.

The device then performs demosaicing and registration operations on each of the synthetic raw images to generate a corresponding registered image represented in the full color space (block 904).

Next, the device chooses a set of patches in each registered image, wherein each patch includes a group of pixels at a location in each registered image, and the location of each patch in one registered image coincides with the location of a corresponding patch in each other registered image (block 906).

The device then generates, for each patch, a corresponding pixel value matrix containing pixel values of each color channel of each pixel included in the corresponding patch in each registered image (block 908).

The device then extracts features from the pixel value matrices (block 910). In some embodiments, the device extracts features including 2D gradients and 2D Laplacians from each corresponding pixel value matrix.

To finish the subprocess 901 for one GT image, the device generates a feature matrix corresponding to the GT image based on the extracted features (block 912).

Finally, after a feature matrix corresponding to each GT image in the set of GT images is generated, the device generates a dictionary of kernels for blending in MFP based on the feature matrices (block 914). In some embodiments, this includes generating, from the feature matrices, a PCA matrix that projects the features in the feature matrices from an image space of the GT images to a principal feature space having a reduced dimensionality, and generating, based on the PCA matrix and pixel values of the patches in the GT images, a dictionary matrix containing dictionary entries in the principal feature space. The dictionary entries may be compared to principal features of an input patch during blending to determine a dictionary entry that is nearest to the principal features of the input patch.

Additionally, the device may generate, for each dictionary entry in the dictionary matrix, a corresponding projection matrix that maps the principal feature space back to the image space. The projection matrix corresponding to the dictionary entry that is nearest to the principal features of the input patch during blending may be used to generate an output patch for the input patch.

The device may also generate a binary search tree for the dictionary entries, wherein the binary search tree is configured to reduce an order of computational complexity associated with finding the nearest dictionary entry for the input patch during blending.

Although FIG. 9 illustrates one example of a method 900 for generating a learned dictionary of kernels for multi-frame blending in an MFP procedure, various changes may be made to FIG. 9. For example, while shown as a series of steps, various steps in FIG. 9 could overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method of constructing a dictionary of kernels for blending in multi-frame processing (MFP), the method comprising:

generating, for each ground truth (GT) image in a set of GT images represented in a full color space, a corresponding feature matrix by:

generating, from the GT image, a set of synthetic raw images represented in a color filter mosaic space, performing demosaicing and registration operations on each of the synthetic raw images to generate a corresponding registered image represented in the full color space, choosing a set of patches in each registered image, wherein each patch includes a group of pixels at a location in each registered image, and the location of each patch in one registered image coincides with the location of a corresponding patch in each other registered image, generating, for each patch, a corresponding pixel value matrix containing pixel values of each color channel of each pixel included in the corresponding patch in each registered image, and extracting features from the pixel value matrices and generating the feature matrix corresponding to the GT image based on the extracted features; and generating the dictionary of kernels based on the feature matrices.

2. The method of claim 1, wherein generating the dictionary of kernels based on the feature matrices further comprises:

generating, from the feature matrices, a principal component analysis (PCA) matrix that projects the features in the feature matrices from an image space of the GT images to a principal feature space having a reduced dimensionality.

3. The method of claim 2, wherein generating the dictionary of kernels based on the feature matrices further comprises:

generating, based on the PCA matrix and pixel values of the patches in the GT images, a dictionary matrix containing dictionary entries in the principal feature space, wherein the dictionary entries are compared to principal features of an input patch during blending to determine a dictionary entry that is nearest to the principal features of the input patch.

4. The method of claim 3, wherein generating the dictionary of kernels based on the feature matrices further comprises:

generating, for each dictionary entry in the dictionary matrix, a corresponding projection matrix that maps the principal feature space back to the image space.

5. The method of claim 4, wherein the projection matrix corresponding to the dictionary entry that is nearest to the principal features of the input patch during blending is used to generate an output patch for the input patch.

6. The method of claim 3, further comprising:

generating a binary search tree for the dictionary entries, wherein the binary search tree is configured to reduce an order of computational complexity associated with finding the nearest dictionary entry for the input patch during blending.

7. The method of claim 1, wherein extracting features from the pixel value matrices and generating the feature matrix corresponding to the GT image further comprises:

extracting features including two dimensional (2D) gradients and 2D Laplacians from each corresponding pixel value matrix.

8. An electronic device comprising:

a processor configured to:

for each ground truth (GT) image in a set of GT images represented in a full color space:

generate, from the GT image, a set of synthetic raw images represented in a color filter mosaic space, perform demosaicing and registration operations on each of the synthetic raw images to generate a corresponding registered image represented in the full color space, choose a set of patches in each registered image, wherein each patch includes a group of pixels at a location in each registered image, and the location of each patch in one registered image coincides with the location of a corresponding patch in each other registered image, generate, for each patch, a corresponding pixel value matrix containing pixel values of each color channel of each pixel included in the corresponding patch in each registered image, extract features from the pixel value matrices, and generate a feature matrix corresponding to the GT image based on the extracted features; and generate a dictionary of kernels for blending in multi-frame processing (MFP) based on the feature matrices.

9. The electronic device of claim 8, wherein the processor configured to generate the dictionary of kernels based on the feature matrices is further configured to:

generate, from the feature matrices, a principal component analysis (PCA) matrix that projects the features in the feature matrices from an image space of the GT images to a principal feature space having a reduced dimensionality.

10. The electronic device of claim 9, wherein the processor configured to generate the dictionary of kernels based on the feature matrices is further configured to:

generate, based on the PCA matrix and pixel values of the patches in the GT images, a dictionary matrix containing dictionary entries in the principal feature space, wherein the dictionary entries are compared to principal features of an input patch during blending to determine a dictionary entry that is nearest to the principal features of the input patch.

11. The electronic device of claim 10, wherein the processor configured to generate the dictionary of kernels based on the feature matrices is further configured to:

generate, for each dictionary entry in the dictionary matrix, a corresponding projection matrix that maps the principal feature space back to the image space.

12. The electronic device of claim 11, wherein the projection matrix corresponding to the dictionary entry that is nearest to the principal features of the input patch during blending is used to generate an output patch for the input patch.

13. The electronic device of claim 10, wherein the processor is further configured to:

generate a binary search tree for the dictionary entries, wherein the binary search tree is configured to reduce an order of computational complexity associated with finding the nearest dictionary entry for the input patch during blending.

14. The electronic device of claim 8, wherein the processor configured to extract features from the pixel value matrices and generate the feature matrix corresponding to the GT image is further configured to:

extract features including two dimensional (2D) gradients and 2D Laplacians from each corresponding pixel value matrix.

15. A non-transitory computer readable medium containing instructions that when executed cause at least one processor of an electronic device to:

for each ground truth (GT) image in a set of GT images represented in a full color space:

generate, from the GT image, a set of synthetic raw images represented in a color filter mosaic space, perform demosaicing and registration operations on each of the synthetic raw images to generate a corresponding registered image represented in the full color space, choose a set of patches in each registered image, wherein each patch includes a group of pixels at a location in each registered image, and the location of each patch in one registered image coincides with the location of a corresponding patch in each other registered image, generate, for each patch, a corresponding pixel value matrix containing pixel values of each color channel of each pixel included in the corresponding patch in each registered image, extract features from the pixel value matrices, and generate a feature matrix corresponding to the GT image based on the extracted features; and generate a dictionary of kernels for blending in multi-frame processing (MFP) based on the feature matrices.

16. The non-transitory computer readable medium of claim 15, wherein the instructions that when executed cause the at least one processor to generate the dictionary of kernels based on the feature matrices further cause the at least one processor to:

generate, from the feature matrices, a principal component analysis (PCA) matrix that projects the features in the feature matrices from an image space of the GT images to a principal feature space having a reduced dimensionality.

17. The non-transitory computer readable medium of claim 16, wherein the instructions that when executed cause the at least one processor to generate the dictionary of kernels based on the feature matrices further cause the at least one processor to:

generate, based on the PCA matrix and pixel values of the patches in the GT images, a dictionary matrix containing dictionary entries in the principal feature space, wherein the dictionary entries are compared to principal features of an input patch during blending to determine a dictionary entry that is nearest to the principal features of the input patch.

18. The non-transitory computer readable medium of claim 17, wherein the instructions that when executed cause the at least one processor to generate the dictionary of kernels based on the feature matrices further cause the at least one processor to:

generate, for each dictionary entry in the dictionary matrix, a corresponding projection matrix that maps the principal feature space back to the image space.

19. The non-transitory computer readable medium of claim 18, wherein the projection matrix corresponding to the dictionary entry that is nearest to the principal features of the input patch during blending is used to generate an output patch for the input patch.

20. The non-transitory computer readable medium of claim 17, further containing instructions that that when executed cause the at least one processor to:

generate a binary search tree for the dictionary entries, wherein the binary search tree is configured to reduce an order of computational complexity associated with finding the nearest dictionary entry for the input patch during blending.

* * * * *